US012366756B2

(12) United States Patent
Alasaarela et al.

(10) Patent No.: US 12,366,756 B2
(45) Date of Patent: Jul. 22, 2025

(54) THICKNESS-MODULATED CONFORMAL COATINGS ON OPTICAL COMPONENTS

(71) Applicant: Microsoft Technology Licensing, LLC, Redmond, WA (US)

(72) Inventors: Tapani Matias Alasaarela, Espoo (FI); Jani Kari Tapio Tervo, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 587 days.

(21) Appl. No.: 17/745,674

(22) Filed: May 16, 2022

(65) Prior Publication Data

US 2023/0072472 A1     Mar. 9, 2023

Related U.S. Application Data

(63) Continuation of application No. 16/451,866, filed on Jun. 25, 2019, now Pat. No. 11,353,702.

(51) Int. Cl.
*C23C 16/455*     (2006.01)
*F21V 8/00*     (2006.01)
(Continued)

(52) U.S. Cl.
CPC ............ *G02B 27/0172* (2013.01); *G02B 1/11* (2013.01); *G02B 1/12* (2013.01); *G02B 1/14* (2015.01); *G02B 6/0016* (2013.01); *G02B 6/0035* (2013.01); *G02B 6/0076* (2013.01); *G02B 27/4272* (2013.01); *G02B 2027/0112* (2013.01); *G02B 2027/0125* (2013.01); *G02B 2027/0178* (2013.01)

(58) Field of Classification Search
CPC ........ G02B 27/0172; G02B 1/14; G02B 1/11; G02B 1/12; G02B 6/0016; G02B 6/0035; G02B 6/0076; G02B 27/4272; G02B 2027/0112; G02B 2027/0125; G02B 2027/0178; G02B 6/0011; G02B 1/10; G02B 27/0081; G02B 2027/0123; C23C 16/455
See application file for complete search history.

(56) References Cited

U.S. PATENT DOCUMENTS

2004/0197527 A1\* 10/2004 Maula ............... C23C 16/45555
428/172
2011/0176218 A1\* 7/2011 Noui .................. G02B 27/0081
385/37

(Continued)

*Primary Examiner* — Balram T Parbadia
(74) *Attorney, Agent, or Firm* — Mark K. Young; Mark K. Young P.C.

(57) ABSTRACT

A near-eye optical display system that may be utilized in mixed reality applications and devices includes a see-through waveguide on which diffractive optical elements (DOEs) are disposed that are configured for in-coupling, exit pupil expansion, and out-coupling. The optical display system includes a conformal coating that is thickness modulated over different areas of the display to enable tuning of the optical parameters such as refractive index and reflectivity to meet various design requirements. The conformal coating may also be utilized to enhance physical characteristics of the optical display system to thereby improve reliability and resist wear and damage from handling and exposure to environmental elements.

20 Claims, 18 Drawing Sheets

(51) Int. Cl.
*G02B 1/11* (2015.01)
*G02B 1/12* (2006.01)
*G02B 1/14* (2015.01)
*G02B 27/01* (2006.01)
*G02B 27/42* (2006.01)

(56) References Cited

U.S. PATENT DOCUMENTS

| | | | |
|---|---|---|---|
| 2012/0044572 A1* | 2/2012 | Simmonds | G02B 6/0061 |
| | | | 385/37 |
| 2012/0120493 A1* | 5/2012 | Simmonds | G02B 27/0172 |
| | | | 359/566 |
| 2015/0086163 A1* | 3/2015 | Valera | G02B 6/0035 |
| | | | 427/163.2 |
| 2019/0056591 A1* | 2/2019 | Tervo | G02B 6/0038 |
| 2019/0137777 A1* | 5/2019 | Yang | G02B 27/4272 |
| 2020/0379259 A1* | 12/2020 | Olkkonen | G02B 6/00 |

* cited by examiner

Aspect ratio = h/w $f = c/d$

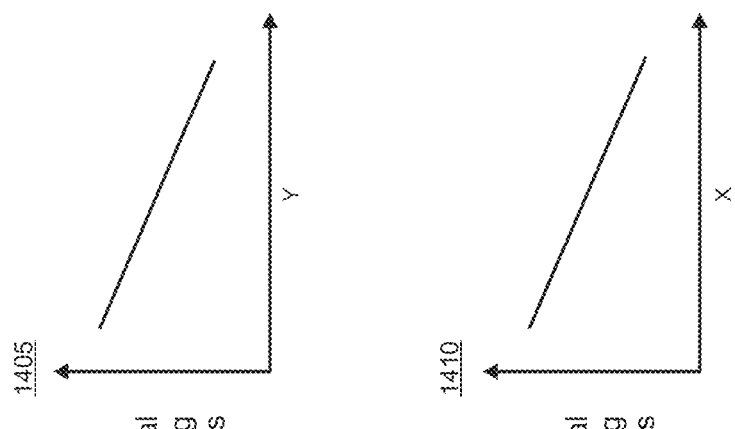
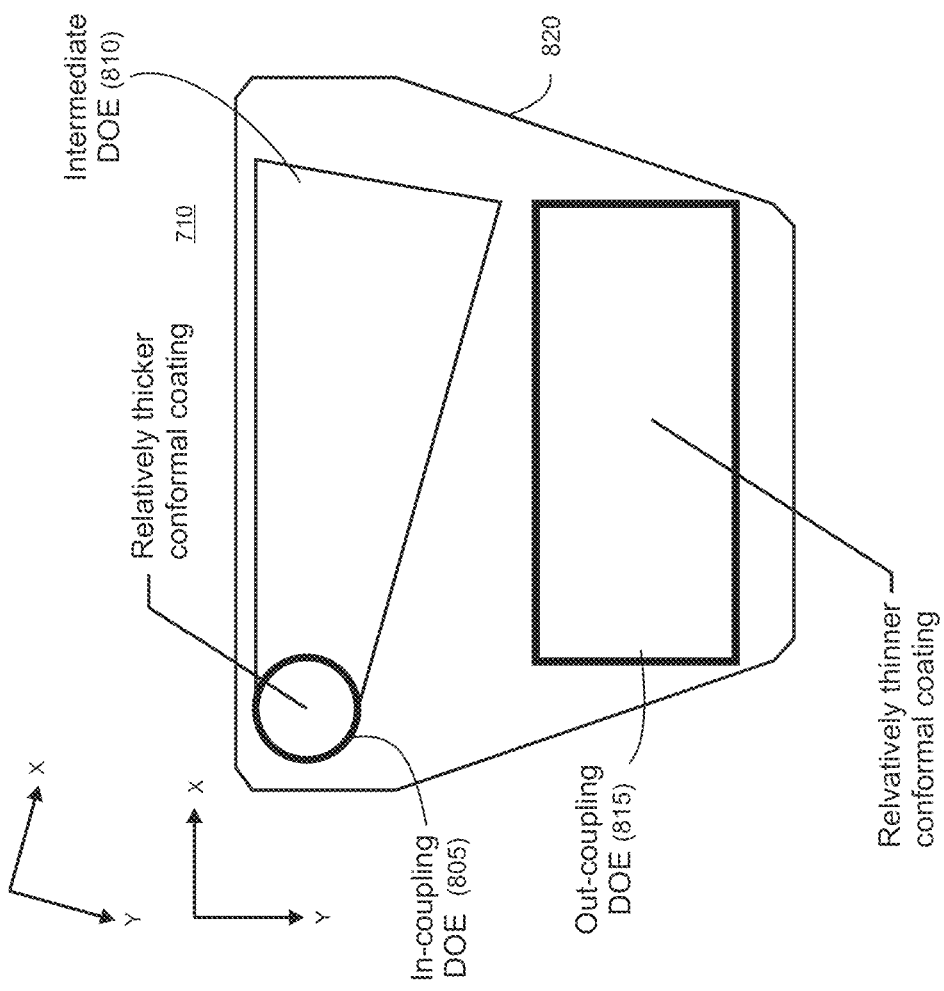
FIG 13
FIG 14

THICKNESS-MODULATED CONFORMAL COATINGS ON OPTICAL COMPONENTS

CROSS-REFERENCE TO RELATED APPLICATIONS

This application is a continuation of and claims priority to U.S. patent application Ser. No. 16/451,866, filed on Jun. 25, 2019 entitled "Thickness-Modulated Conformal Coatings on Optical Components," the disclosure of which is incorporated herein by reference in its entirety.

BACKGROUND

Mixed reality computing devices, such as head mounted display (HMD) devices and systems and handheld mobile devices (e.g. smart phones, tablet computers, etc.), may be configured to display information to a user about virtual and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

A near-eye optical display system that may be utilized in mixed reality applications and devices includes a see-through waveguide on which diffractive optical elements (DOEs) are disposed that are configured for in-coupling, exit pupil expansion, and out-coupling. The optical display system includes a conformal coating that is thickness-modulated over different areas of the display to enable tuning of the optical parameters such as refractive index and reflectivity to meet various design requirements. The conformal coating may comprise layers of different materials in a thickness-modulated thin film stack that may be utilized to enhance physical characteristics of the optical display system to thereby improve reliability and resist wear and damage from handling and exposure to environmental elements.

In various illustrative embodiments, the conformal coating on the optical display system may be thickness-modulated in a single direction or in multiple directions. For example, a relatively thick high refractive index conformal coating may be disposed on the in-coupling DOE and the thickness of the conformal coating over the rest of the display can gradually diminish towards the out-coupling DOE. The smooth transition in thickness advantageously avoids degradation of the MTF (modulation transfer function) in the optical display system that might otherwise occur with sharp transitions. The relatively thinner conformal coating on the out-coupling DOE reduces undesirable reflections in the area of the optical display through which a user looks to see the real-world environment. Such anti-reflection properties of the conformal coating on the grating side of the optical display system can further optimize the see-through characteristics of the system. Light is either transmitted through the display or is coupled out of the display by the out-coupling DOE so that unwanted reflected light in the system is minimized.

The thickness-modulated conformal coating may be implemented using spatial ALD (atomic layer deposition) which may be enhanced with plasma in a technique known as plasma enhanced ALD (PEALD). Other CVD (chemical vapor deposition) processes such as pulsed plasma CVD and traditional thermal ALD may also be utilized in some implementations. In addition to additive processes using ALD or CVD, the parameters of the optical display system can be further refined using subtractive processes such as etching. In applications where the DOEs are replicated with polymeric materials, thickness-modulated conformal coatings may be applied to a hard master grating, and optionally refined using subtractive processes. This advantageously enables multiple types of DOEs with varying characteristics to be replicated by changing the thickness-modulated conformal coating on a single hard master.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIGS. 13 and 14 show an illustrative distribution of a thickness-modulated conformal coating on an optical component;

Like reference numerals indicate like elements in the drawings. Elements are not drawn to scale unless otherwise indicated.

DETAILED DESCRIPTION

Figure 1:
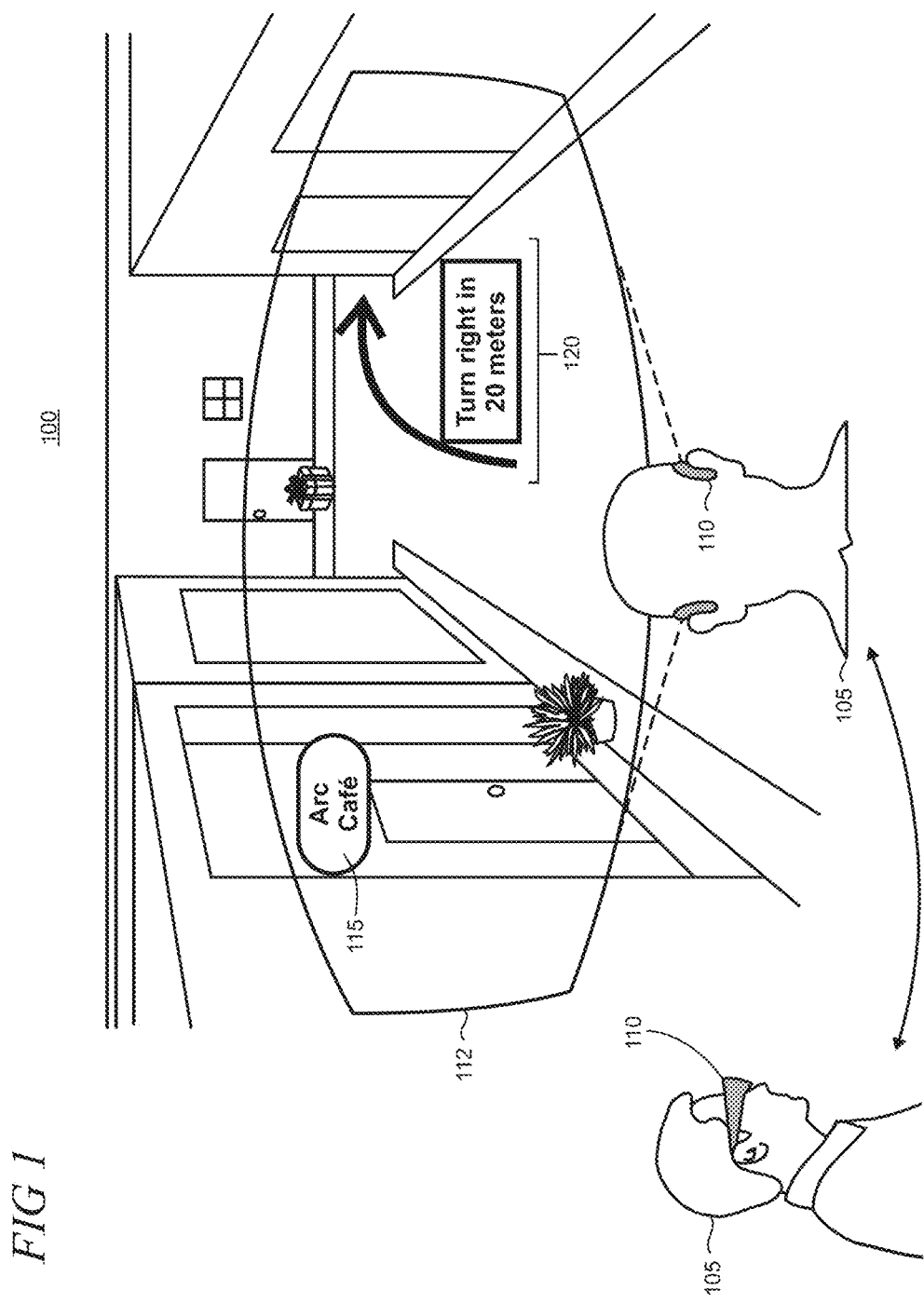
FIG. 1 shows an illustrative mixed reality environment, a portion of which is rendered within the field of view of a user of a head-mounted display (HMD) device.

FIG. 1 shows an illustrative mixed reality environment 100, a portion of which is rendered within the field of view of a user of a head-mounted display (HMD) device 110. A mixed reality environment typically combines real-world elements and computer-generated virtual elements to enable a variety of user experiences. In the illustrative example shown in FIG. 1, a user 105 can employ the HMD device to experience a mixed reality environment 100 that is rendered visually on an optics display and may include audio and/or tactile/haptic sensations in some implementations. In this particular non-limiting example, the HMD device user is physically walking in a real-world urban area that includes city streets with various buildings, stores, etc. The field of view (FOV), represented by the area 112 in FIG. 1, of the cityscape supported on HMD device changes as the user moves through the environment and the device can render virtual images over the real-world view. Here, the virtual images illustratively include a tag 115 that identifies a restaurant business and directions 120 to a place of interest in the city.

Figure 2:
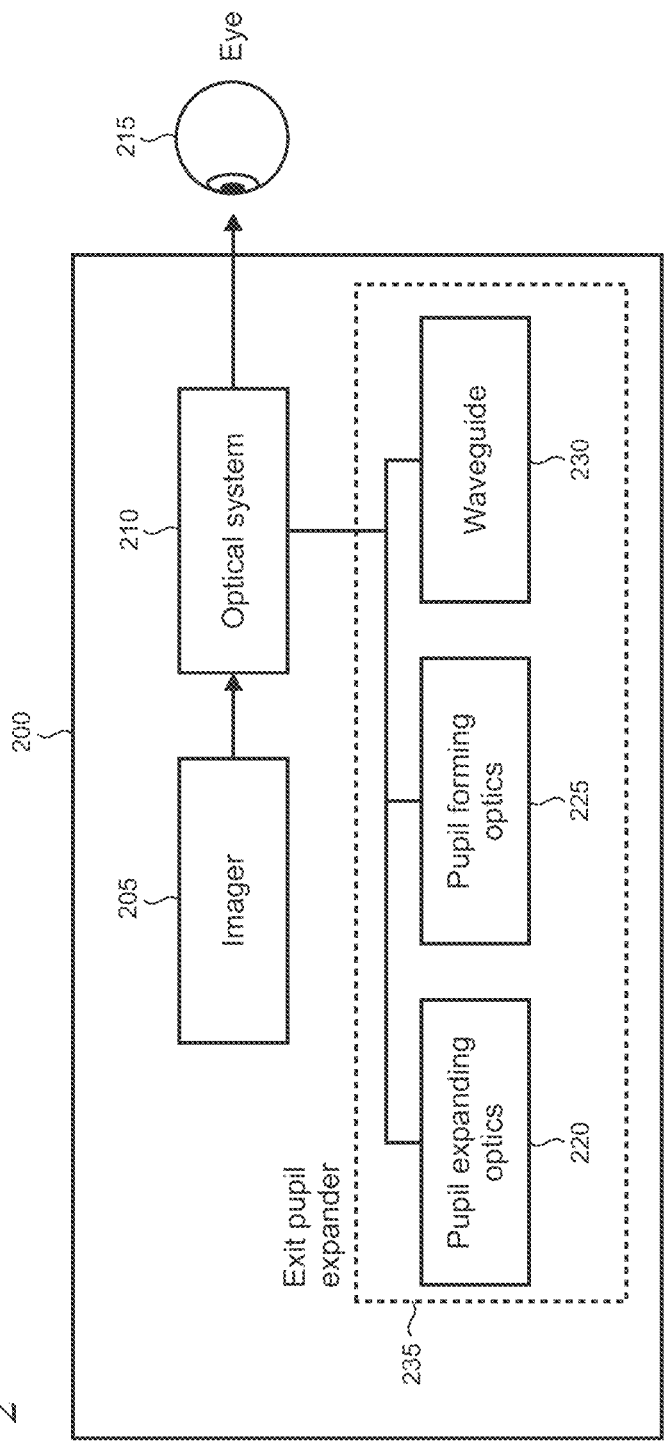
FIG. 2 shows a block diagram of an illustrative see-through near-eye display system that supports a mixed reality environment.

FIG. 2 shows a block diagram of an illustrative near-eye display system 200 that can be utilized to support a mixed reality environment and may include an imager 205 that works with an optical system 210 to deliver images as a virtual display to a user's eye 215. The imager 205 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 205 may also include mirrors and other components that enable a virtual display to be composed and provide one or more input optical beams to the optical system. The optical system 210 can typically include pupil expanding optics 220, pupil forming optics 225, and one or more waveguides 230 that are collectively referred to here as an exit pupil expander (EPE) 235.

In a near-eye display system the imager does not actually shine the images on a surface such as a glass lens to create the visual display for the user. This is not feasible because the human eye cannot focus on something that is that close. Rather than create a visible image on a surface, the near-eye optical system 200 uses the pupil forming optics 225 to form a pupil and the eye 215 acts as the last element in the optical chain and converts the light from the pupil into an image on the eye's retina as a virtual display.

Figure 3:
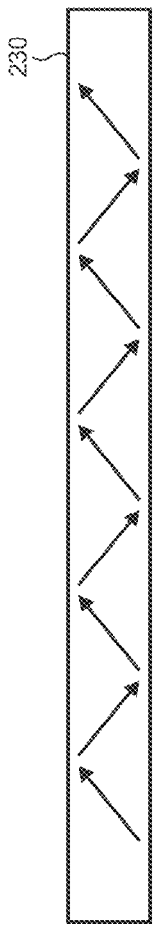
FIG. 3 shows propagation of light in a waveguide by total internal reflection.

The waveguide 230 facilitates light transmission between the imager and the eye. One or more waveguides can be utilized in the near-eye display system 200 because they are transparent and because they are generally small and light-weight (which are desirable in applications such as HMD devices where size and weight is generally sought to be minimized for reasons of performance and user comfort). For example, the waveguide 230 can enable the imager 205 to be located out of the way, for example, on the side of the head, leaving only a relatively small, light, and transparent waveguide optical element in front of the eyes. In one implementation, the waveguide 230 operates using a principle of total internal reflection, as shown in FIG. 3, so that light can be coupled among the various optical elements in the system 200.

Figure 4:
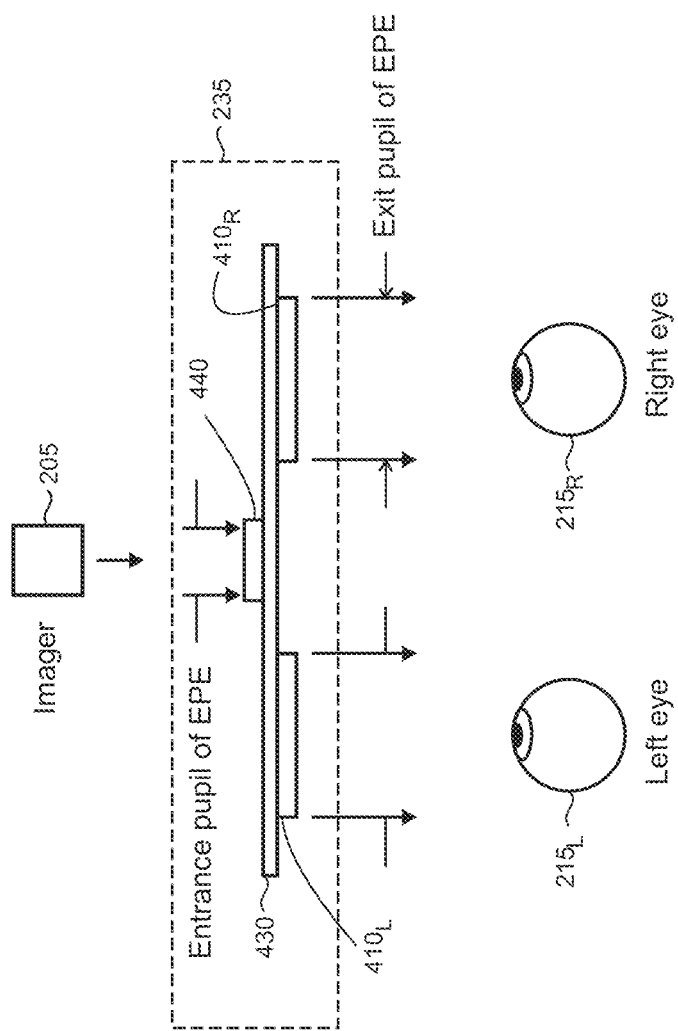
FIG. 4 shows a view of an illustrative exit pupil expander.

FIG. 4 shows a view of an illustrative exit pupil expander (EPE) 235. EPE 235 receives an input optical beam from the imager 205 through pupil expanding optics 220 to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 235 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 4 for sake of clarity in exposition. The EPE 235 utilizes two out-coupling gratings, $410_L$ and $410_R$ that are supported on a waveguide 430 and a central in-coupling grating 440. In alternative embodiments, multiple in-coupling gratings may be utilized. The in-coupling and out-coupling gratings may be configured using multiple DOEs, as described in the illustrative example described below and shown in FIG. 8. While the EPE 235 is depicted as having a planar configuration, other shapes may also be utilized including, for example, curved or partially spherical shapes, in which case, the gratings disposed thereon are non-co-planar.

Figure 5:
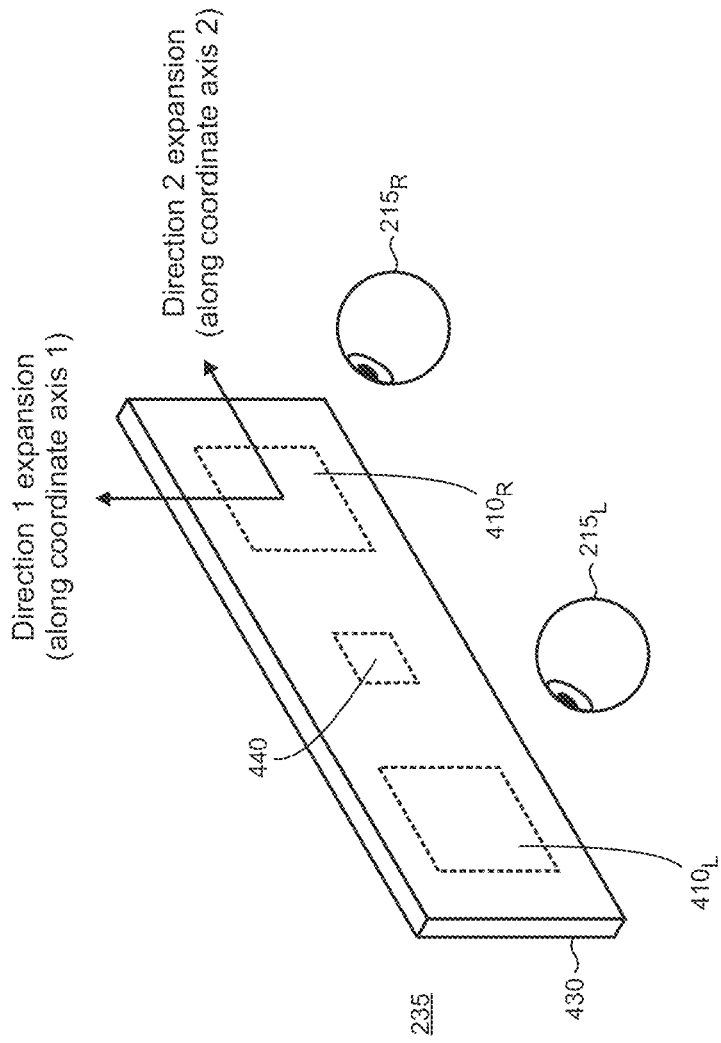
FIG. 5 shows a view of the illustrative exit pupil expander in which the exit pupil is expanded along two directions.

As shown in FIG. 5, the EPE 235 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of the present mixed reality display system using optical components with thickness-modulated conformal coatings.

Figure 6:
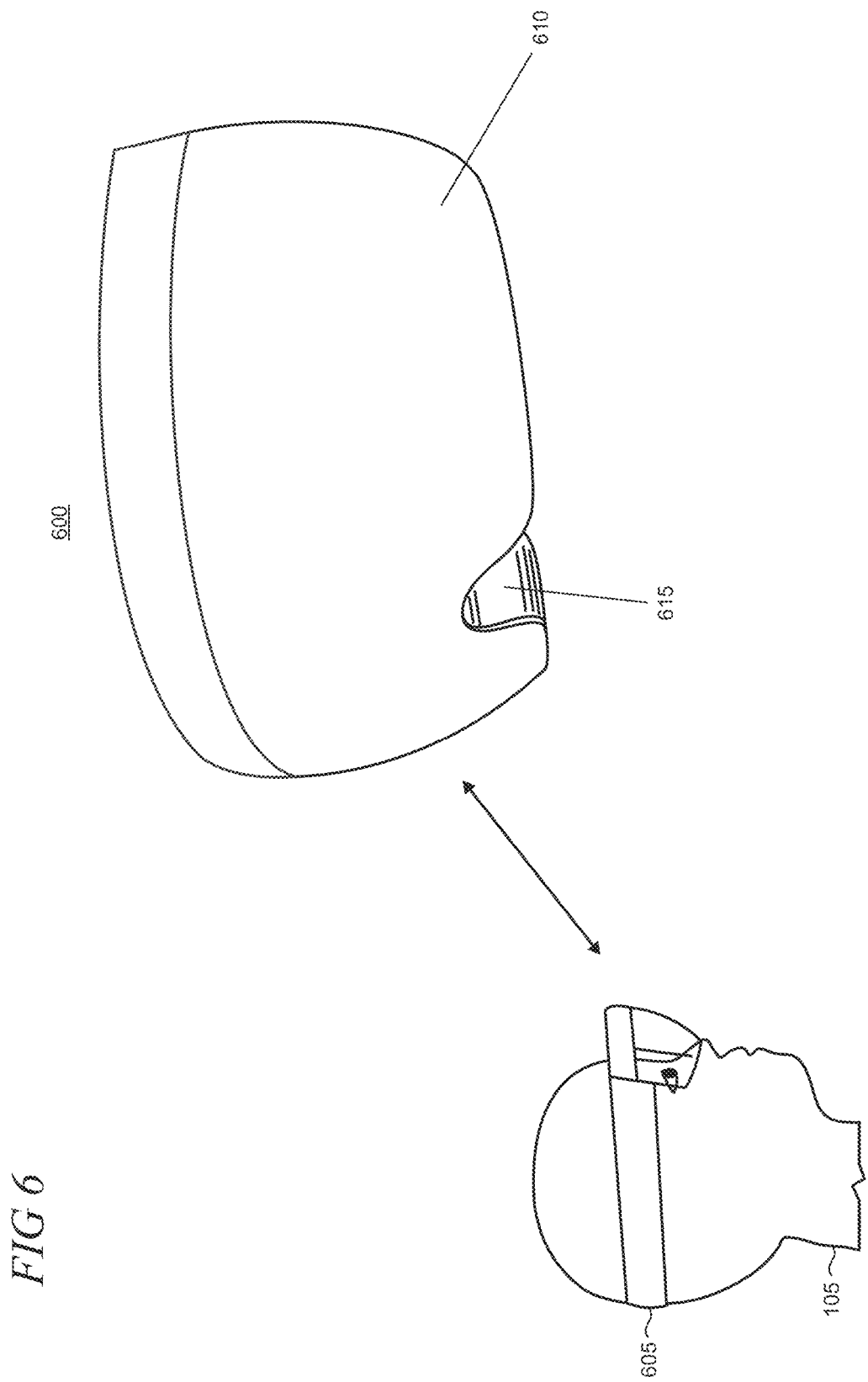
FIG. 6 shows a pictorial front view of a sealed visor that may be used as a component of a head mounted display (HMD) device.

FIG. 6 shows an illustrative example of a visor 600 that incorporates an internal near-eye optical display system that is used in an exemplary HMD device 605 worn by a user 105. The visor 600, in this example, is sealed to protect the internal near-eye optical display system. The visor 600 typically interfaces with other components of the HMD device 605 such as head mounting/retention systems and other subsystems including sensors, power management, controllers, etc., as illustratively described in conjunction with FIGS. 23 and 24. Suitable interface elements (not shown) including snaps, bosses, screws and other fasteners, etc. may also be incorporated into the visor 600.

The visor 600 includes see-through front and rear shields, 610 and 615 respectively, that can be molded using transparent materials to facilitate unobstructed vision to the optical displays and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 705 shown in the disassembled view in FIG. 7.

The sealed visor 600 can physically protect sensitive internal components, including an instance of a near-eye optical display system 710 (shown in FIG. 7), when the HMD device is used in operation and during normal handling for cleaning and the like. The near-eye optical display system 710 includes left and right waveguide displays 720 and 725 that respectively provide virtual world images to the user's left and right eyes for mixed- and/or virtual-reality applications. The visor 600 can also protect the near-eye optical display system 710 from environmental elements and damage should the HMD device be dropped or bumped, impacted, etc.

Figure 7:
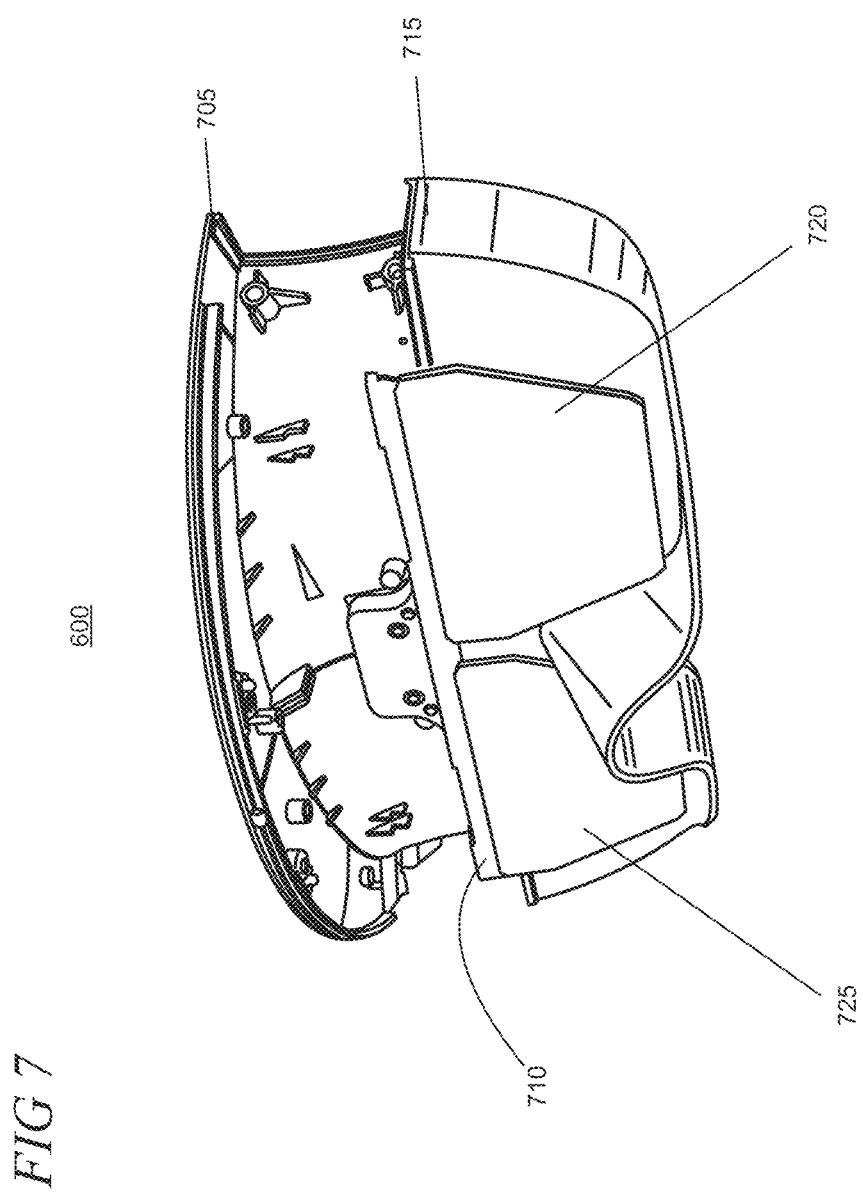
FIG. 7 shows a partially disassembled view of the sealed visor.

As shown in FIG. 7, the rear shield 715 is configured in an ergonomically suitable form to interface with the user's nose, and nose pads and/or other comfort features can be included (e.g., molded-in and/or added-on as discrete components). The sealed visor 600 can also incorporate some level of optical diopter curvature (i.e., eye prescription) within the molded shields in some cases.

Figure 8:
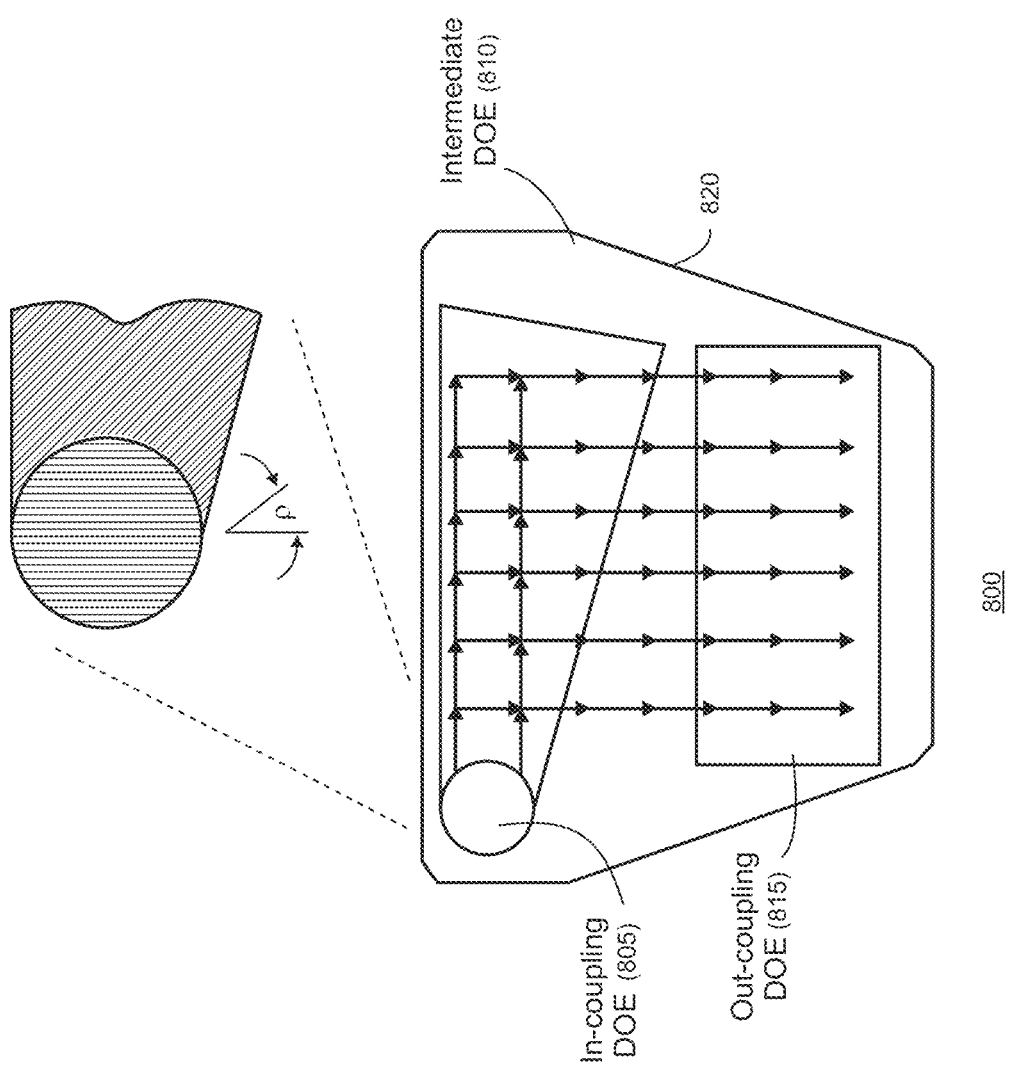
FIG. 8 shows an illustrative arrangement of three DOEs using surface relief gratings (SRG) configured for in-coupling, exit pupil expansion, and out-coupling.

FIG. 8 shows an illustrative arrangement 800 of three DOEs that may be used with, or as a part of, a diffractive waveguide to provide in-coupling, expansion of the exit pupil in two directions, and out-coupling in an EPE. In this particular illustrative example, DOEs are utilized for in-coupling and out-coupling, however in other implementations either or both the in-coupling and out-coupling may be performed using one or more of dichroic mirrors, polarization-selective coatings or materials, or prism structures that operate in refraction or reflection.

Each DOE is an optical element comprising a periodic structure that can modulate various properties of light in a periodic pattern such as the direction of optical axis, optical path length, and the like. The first DOE, DOE 1 (indicated by reference numeral 805), is configured to couple an imaging beam from an imager into the waveguide. The second DOE, DOE 2 (810), expands the exit pupil in a first direction along a first coordinate axis, and the third DOE, DOE 3 (815), expands the exit pupil in a second direction along a second coordinate axis and couples light out of the waveguide 820 (it is noted that the various directions of propagation in FIG. 8 are depicted in an arbitrary manner and that the directions are not necessarily orthogonal). The angle $\square$ is a rotation angle between the periodic lines of DOE 2 and DOE 3 as shown.

DOE 1 thus functions as an in-coupling grating and DOE 3 functions as an out-coupling grating while expanding the pupil in one direction. DOE 2 may be considered as an intermediate grating that functions to couple light between the in-coupling and out-coupling gratings while performing exit pupil expansion in another direction. Using such intermediate grating may eliminate a need for conventional functionalities for exit pupil expansion in an EPE such as collimating lenses. Some near-eye display system applications, such as those using HMD devices for example, can benefit by minimization of weight and bulk. As a result, the DOEs and waveguides used in an EPE may be fabricated using lightweight polymers. Such polymeric components can support design goals for, size, weight, and cost, and generally facilitate manufacturability, particularly in volume production settings. While DOE 2 is shown as a single grating in FIG. 8, multiple intermediate gratings may be used, or DOE 2 may include a plurality of discrete grating areas depending on requirements for a given implementation of thickness-modulated conformal coatings.

Figure 9:
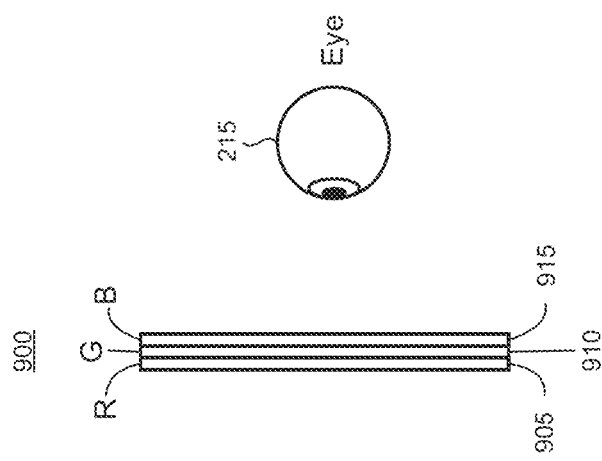
FIG. 9 shows an illustrative stack of three waveguides with integrated DOEs in which each waveguide handles a different color in an RGB (red, green, blue) color space.

FIG. 9 shows an illustrative stack 900 of three waveguides with integrated DOEs in a waveguide display in which each waveguide 905, 910, and 915 handles a different color in the RGB (red, green, blue) color space. The color order within the stack can vary by implementation and other color spaces may also be used. Use of the waveguide stack enables virtual images to be guided to the eye 115 across a full-color spectrum. In alternative implementations, stacks with more or fewer waveguides can be utilized, for example, for monochromatic and reduced-color spectrum applications. A single plate may be used in some applications, while other applications can use other plate counts.

Figure 10:
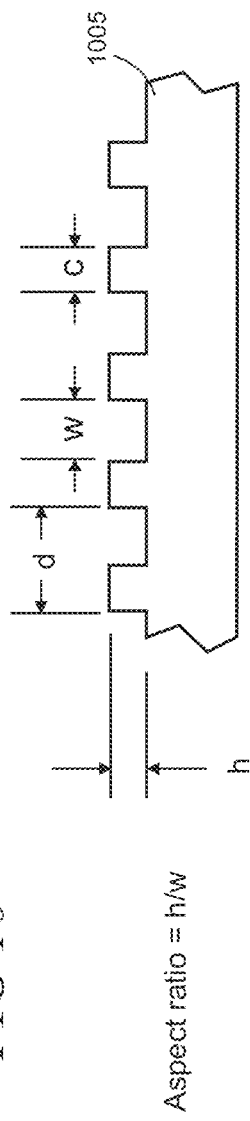
FIG. 10 shows a profile of a portion of an illustrative diffraction grating that has straight grating features.
Figure 11:
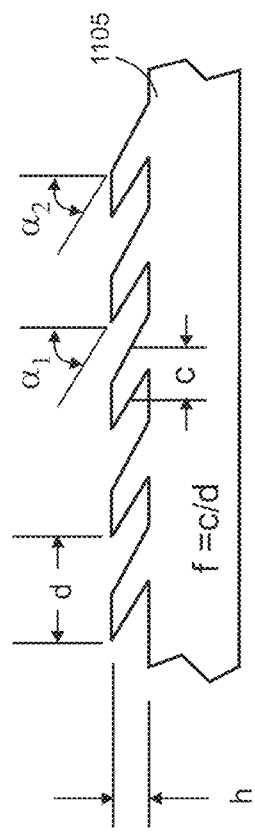
FIG. 11 shows an asymmetric profile of a portion of an illustrative diffraction grating that has asymmetric or slanted grating features.

The three-dimensional microstructure forming the DOEs, can be configured to provide particular targeted optical characteristics by manipulating a combination of grating parameters such as grating depth, line asymmetry, and fill ratio. Grating line asymmetry is described in more detail while making reference to FIGS. 10 and 11. FIG. 10 shows a profile of straight (i.e., non-slanted) grating features 1000 (referred to as grating bars, grating lines, or simply "gratings"), that are formed in a substrate 1005. By comparison, FIG. 11 shows grating features 1100 formed in a substrate 1105 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 10 and 11, the grating period is represented by d, the grating height by h (also referred to as grating "depth"), bar width by c, and the fill factor by f, where f=c/d. The aspect ratio is defined by h/w. The slanted gratings in FIG. 11 may be described by slant angles $\square_1$ and $\square_2$.

Figure 12:
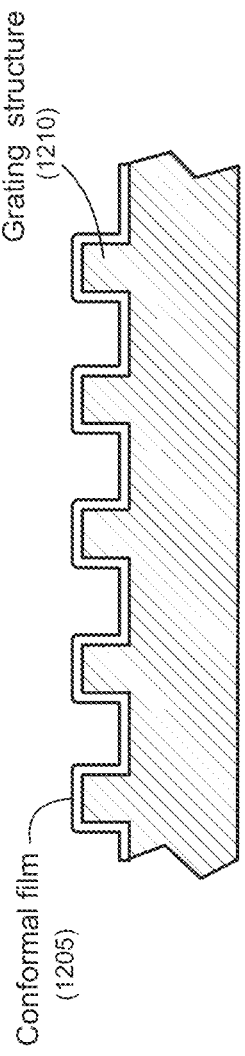
FIG. 12 shows an illustrative conformal coating having substantially uniform thickness that is disposed over straight diffraction grating features.

FIG. 12 shows an illustrative coating 1205 having substantially uniform thickness that is disposed over straight diffraction grating structures 1210, The coating is considered conformal as it reaches and covers all of the three-dimensional grating structures including the floors and walls of the trenches. In most thin-film deposition processes, conformal film growth is managed by manipulating exposure and purge times to increase saturation of the grating's nonplanar surfaces (e.g., the bottoms of the trenches). Accordingly, conformal coatings for very high aspect ratio gratings can become impractical due to lengthy exposure times.

FIGS. 13 and 14 show an illustrative distribution of a thickness-modulated conformal coating on an SRG optical component 710 such as the DOE elements in the near-eye waveguide display used in the HMD device 605 (FIG. 6). In some implementations, the conformal coating thickness may be modulated along a single direction, for example, in either the X or Y direction shown (it is noted that the coordinate system is arbitrary and the axes may be oriented to match particular features of the optical elements in the display such as DOE shape, groove direction, and the like). In other implementations, the conformal coating thickness may be modulated in two directions, for example in both the X and Y directions.

In an exemplary implementation, a relatively thick high refractive index conformal coating is disposed on the in-coupling DOE 805 such as zinc sulfide, zinc oxide, tantalum oxide, hafnium oxide, zirconium oxide, titanium oxide, aluminum oxide, silicon nitride, or mixtures thereof. For example, increasing the refractive index at the in-coupling DOE can increase the field-of-view of the optical display system. The conformal thickness is modulated to gradually diminish towards the out-coupling DOE 815. The smooth transition advantageously avoids degradation of MTF in the SRG optical component 710. Thus, in both the one-dimensional thickness modulation and two-dimensional thickness modulation scenarios, conformal coating thickness decreases with increasing distance from the in-coupling DOE, as shown in graphs 1405 and 1410 in FIG. 14. The relatively thinner conformal coating on the out-coupling DOE 815 reduces undesirable reflections in the area of the optical display through which the user looks to see the real-world environment. In another embodiment, multiple thickness-controlled conformal coatings that are either high or low refractive index could be combined together to form a thickness modulated optical thin film stack. Suitable lower index materials could be for example aluminum oxide, silicon oxide, magnesium fluoride, The present thickness-modulated conformal coatings may be applied to the SRG optical component 710 using a thermal ALD process. In alternative implementations, the thickness-modulated conformal coating may be applied to a hard master, such as a quartz crystalline structure. Such coating application can thereby be utilized to adjust various physical characteristics to enable multiple different types and configurations of gratings to be cast from a single master. For example, a conformal coating may enable certain dimensions to be adjusted more readily than can be otherwise achieved using subtractive processes such as etching.

Figure 15:
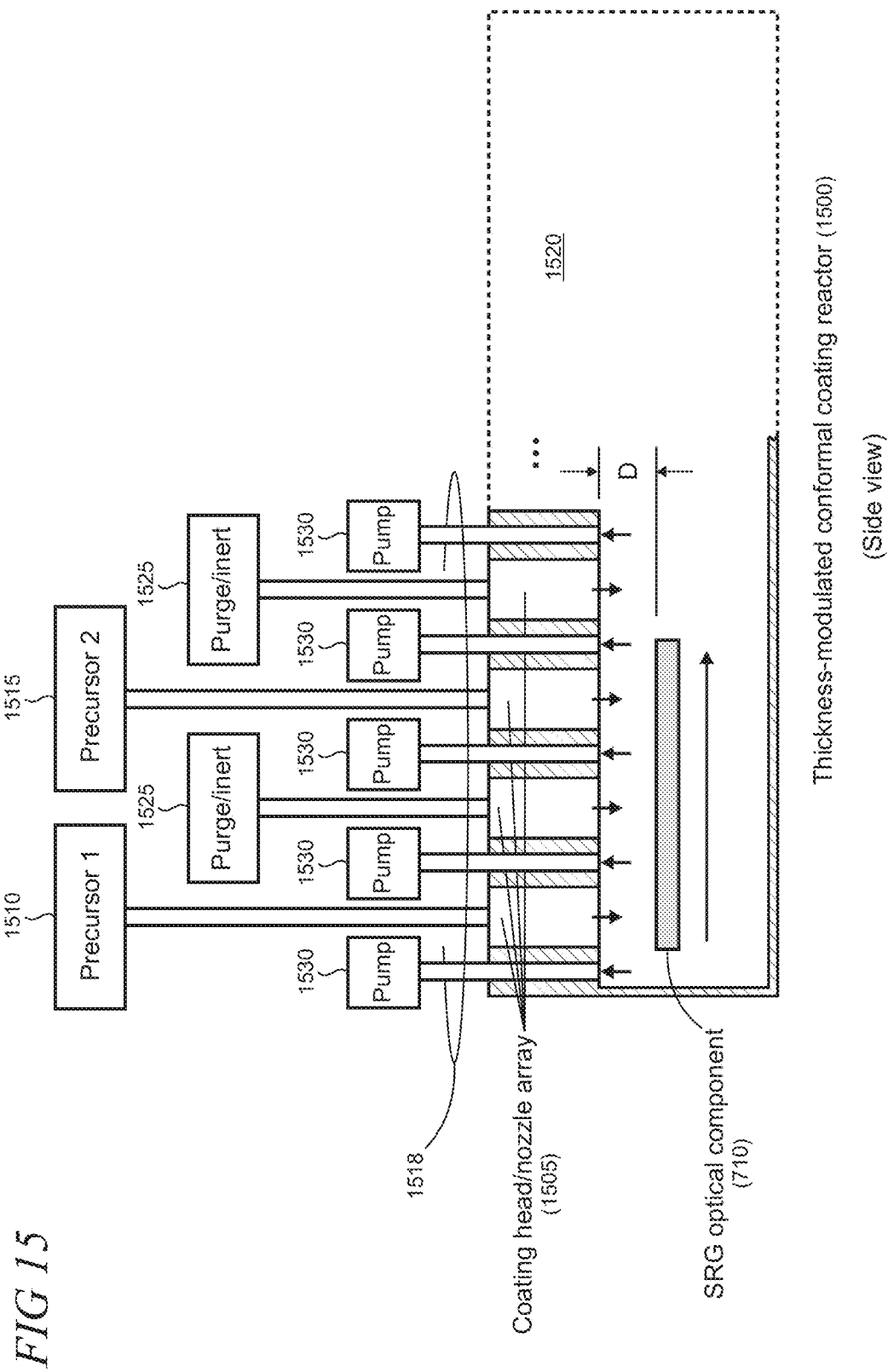
FIG. 15 shows a cutaway side view of an illustrative thickness-modulated conformal coating reactor in which coating heads or nozzles are arranged to operate in a linear manner.

FIG. 15 shows a cutaway side view of an illustrative thickness-modulated conformal coating reactor 1500 in which coating heads or nozzles (collectively referred to by reference numeral 1505) are arranged operate in a linear manner at some distance D from the SRG substrate. In a typical spatial ALD process, the reactor heats the components to a desired deposition temperature. Precursors 1510 and 1515 (labeled precursor 1 and precursor 2 in the drawing) and/or co-reactants (not shown) are delivered from manifolds 1518 and injected into the interior reactor volume 1520. An inert gas 1525 may be utilized used to form a diffusion barrier in between each ALD precursor inlet. The inert gas/precursor mixture is then pumped away around the precursor nozzles to prevent the precursors reacting with each other in the gas phase. In this illustrative example, the ALD processes are carried out at atmospheric pressures. In alternative implementations, the reactor volume may be continuously pumped to achieve a certain pressure. Pressures are typically between 0.1 and 750 Torr, but pressures at an mTorr level may also be utilized. Typically, constant pumping of the reactor volume is needed even at atmospheric pressure, utilizing one or more pumping sources 1530, to form an inert gas diffusion barrier between the precursors.

As an alternative to traditional thermal ALD, in some implementations the thickness-modulated conformal coating reactor 1500 may be configured to utilize plasma-enhanced ALD (PEALD). For example, mechanical masking may be utilized in some scenarios to enable additional control over conformal coating thickness modulation. PEALD may offer better opportunities for mechanical masking as the lifetime of plasma radicals is limited. PEALD can also be advantageously utilized to lower costs at large-scale manufacturing volumes.

PEALD typically provides much sharper coating edges because the plasma radical lifetime limits the deposition distance and macroscopic cavities. Plasma processes also enable more control over the film stresses, which enables the thicker film stacks on organic materials. However, temporal PEALD processes have been difficult to scale into large batch reactors. Spatial PEALD may be expected to enable easier control over the ALD growth as both the precursor exposure and plasma exposure can be more easily limited spatially. Also, the low temperature, fast cycle times and better stress control should enable deposition of thicker ALD layers cost-effectively.

The thickness-modulated conformal coating reactor 1500 is arranged to limit the precursor or plasma exposure to certain areas of the SRG optical component 710. As shown in FIG. 15, the first and second precursor heads 1505 each deliver a substantially continuous flow of precursor gas or plasma or pulses of precursor gas or plasma. In an ALD reaction, the first precursor delivered from the first head reacts with and chemically alters the coating surface of the SRG optical component 710 before being exposed to the second precursor exiting from the second head. The chemically altered coating surface then reacts with the second precursor to form a solid material layer or thin film onto the SRG optical component 710. For example, the precursors gases or plasmas may include TMA (trimethyl aluminum) and carbon dioxide plasma for the aluminum oxide conformal coating, TTIP (titanium tetraisopropoxide) and carbon dioxide plasma for the titanium dioxide conformal coating, DEZ (diethyl zinc) and H2S (hydrogen sulfide) for zinc sulfide conformal coating.

Figure 16:
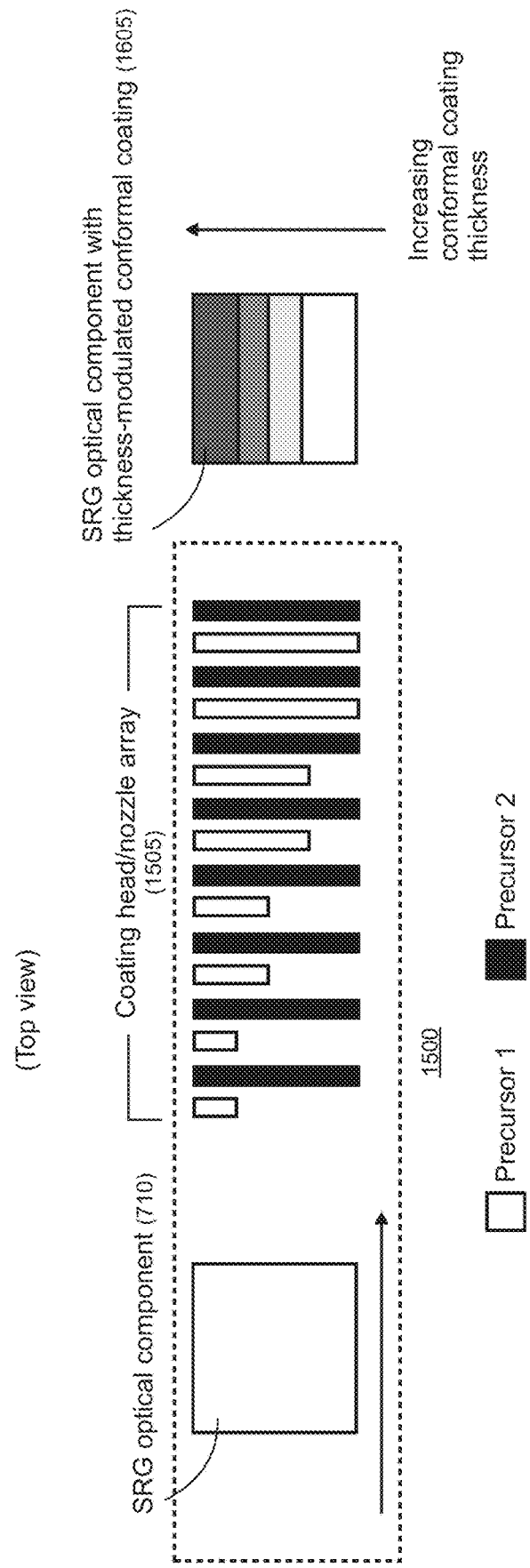
FIG. 16 shows a cutaway top view of an illustrative thickness-modulated conformal coating reactor.

Using a transport mechanism (not shown), the SRG optical component 710 is moved within the reactor volume over a path (from left to right in the drawing) to thereby be exposed to a linear array of coating heads. As shown in the top view of the thickness-modulated conformal coating reactor 1500 in FIG. 16, alternating precursors are sequentially exposed to the SRG optical component 710 by the coating head array 1505. Individual coating heads in the array 1505 may be configured with different sizes and/or shapes. The coating heads may be fixed or variably configurable in some implementations. In this illustrative example, the coating heads for precursor 1 increase in width along the length of the reactor. The coating heads for precursor 2 have a fixed width that is approximately the width of the SRG optical component 710.

The sequence of increasing coating head width for precursor 1 provides for thickness modulation of the conformal coatings that are grown on the SRG optical component 710 because each sequential exposure increases the coating thickness. However, as some portions of the SRG optical component are exposed to fewer coating heads in the sequence compared to other portion, those portions will have a relatively thinner conformal coating thickness. This thickness modulation is shown on the ALD-processed SRG optical component 1605 where the darker shading indicates relative increased coating thickness. Multiple passes of the SRG optical component through the reactor 1500 may be utilized to grow the conformal coating to a target thickness, as needed.

Figure 17:
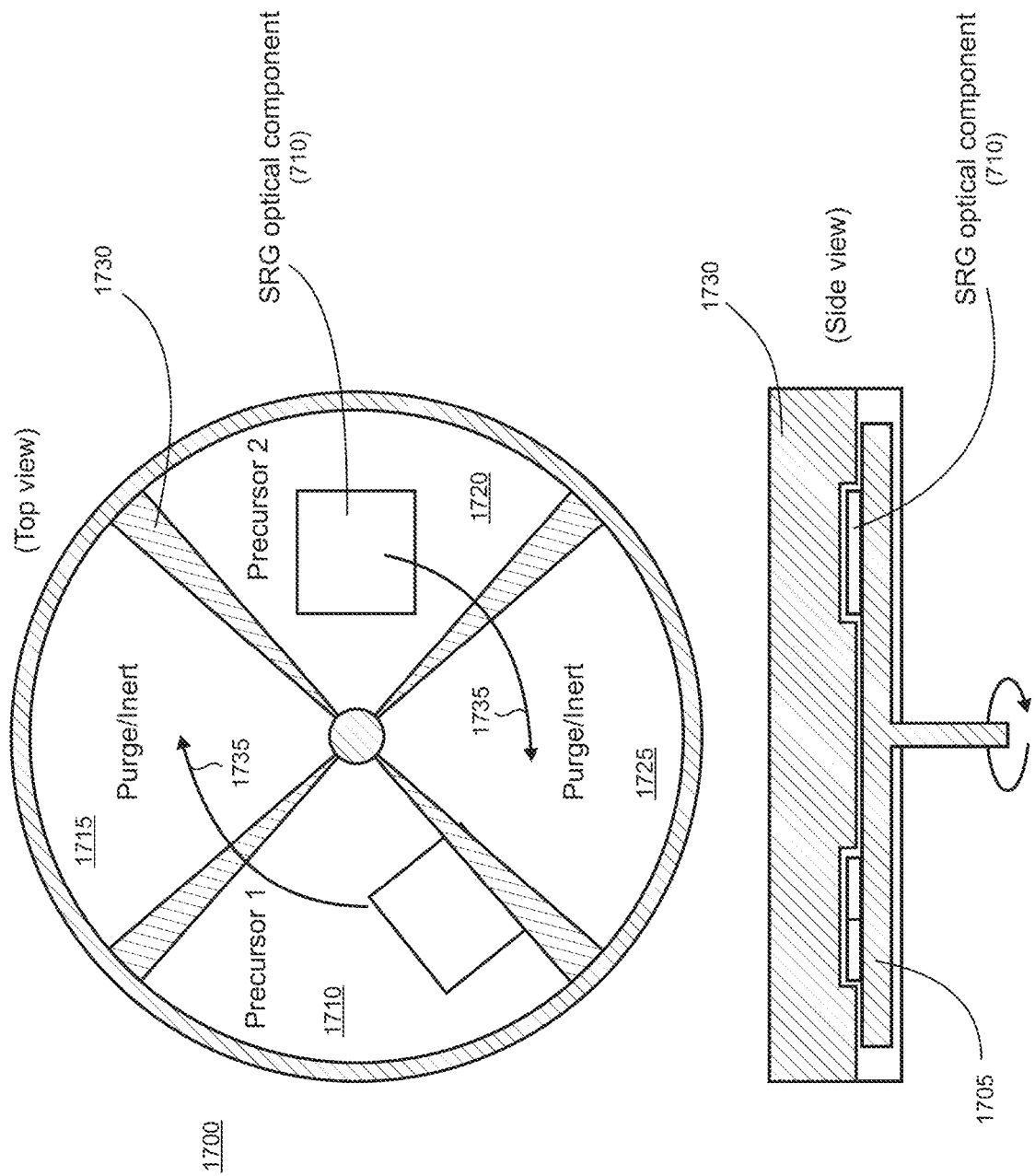
FIG. 17 shows cutaway top and side views of an illustrative thickness-modulated conformal coating reactor that operates in a rotary manner.

FIG. 17 shows cutaway top and side views of an illustrative thickness-modulated conformal coating reactor 1700 that operates in a rotary manner whereby a substrate carrier 1705 rotates about its axis within an ALD reaction chamber that is divided into several sub-chambers or processing zones 1710, 1715, 1720, and 1725. In some configurations, the processing zones and be physically separated using one or more mechanical barriers 1730, while in other configurations the processing zones or more simply implemented within a single interior volume. Physically isolated processing zones may be utilized, for example, when differential environments are utilized between processing steps such as different temperatures and/or pressures. In addition, physical partitions may help inhibit precursors in one zone from leaking into others.

The SRG optical component 710 is transported along a circular path (as indicated by reference numeral 1735) sequentially through first and second precursor zones 1710 and 1720. Purge zones 1715 and 1725 may be interleaved between the precursor zones in some implementations. The processing zones can vary in size and shape to meet the needs of a particular implementation. As with the illustrative reactor example shown in FIGS. 15 and 16 and described in the accompanying text, PEALD or other CVD processes may be utilized to grow the conformal coating.

Figure 18:
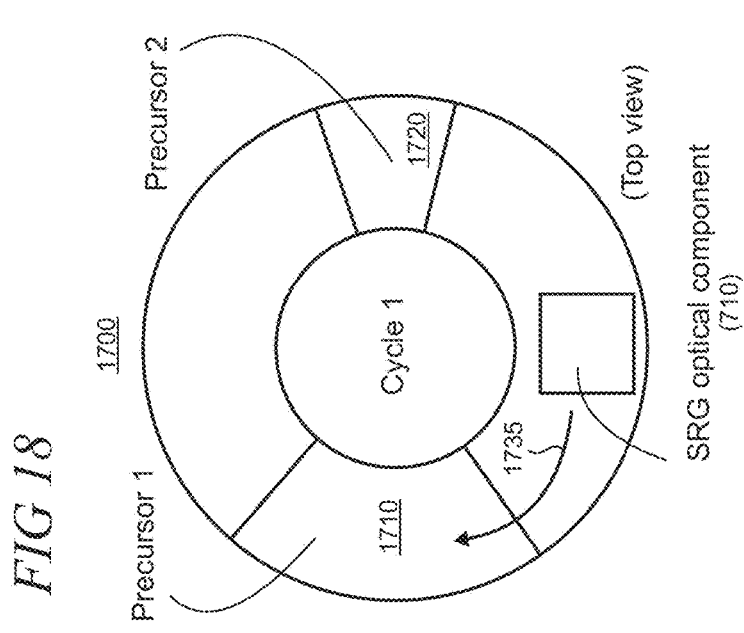
FIG. 18 shows an illustrative sequence of processing cycles in a rotary thickness-modulated conformal coating reactor in which a variably operable opening is configured to expose certain areas of the SRG optical component to a precursor or plasma.

As shown in a cutaway top view in FIG. 18, the SRG optical component 710 may be cyclically processed in the reactor 1700 whereby each 360° rotation of the substrate carrier 1705 exposes the component to one ALD growth cycle comprising precursor 1 followed by precursor 2. As discussed above, reaction between the precursors provides for growth of the conformal coating.

A variable plasma/gas opening 1750 is disposed in the reactor 1700 that is configured to operate to preferentially expose particular areas of the SRG optical component 710 to precursor 2 in processing zone 1720. By changing the size of the variable opening at each rotational cycle, thickness modulated conformal growth can be achieved on the component.

Figure 19:
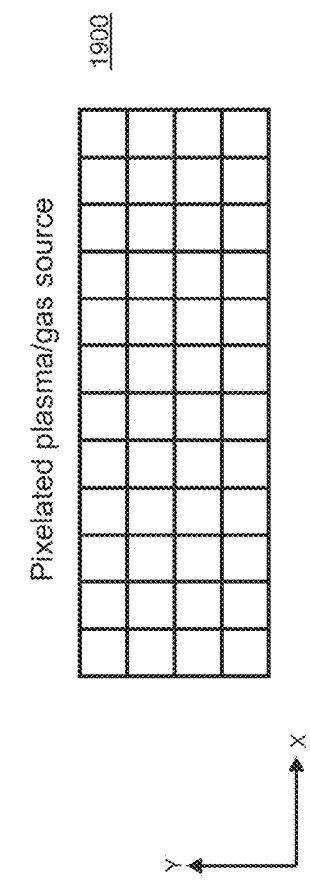
FIG. 19 shows an illustrative pixelated plasma or gas source.

FIG. 19 shows an illustrative pixelated plasma or gas source 1900 which may alternatively be utilized in either or both of the linear or rotary reactors 1500 and 1700 described above. The pixelated source 1900 includes a two-dimensional array of coating heads where each element in the array provides a discrete spatial location for the discharge of an appropriate gas or plasma. For purposes of illustration, each array element is simplified, however, it may be understood that multiple different coating heads may be provided at each array location. Thus, for example, different precursors and/or inert materials may be discharged in a desired two-dimensional spatial pattern.

The pixelated source 1900 may be operated in a cyclical manner to provide spatially thickness-modulated conformal coatings on the SRG optical component 710 (FIG. 7) along two directions, X and Y, as shown. It is noted that the dimensions of the pixelated array can be varied to meet the needs of a particular implementation.

Figure 20:
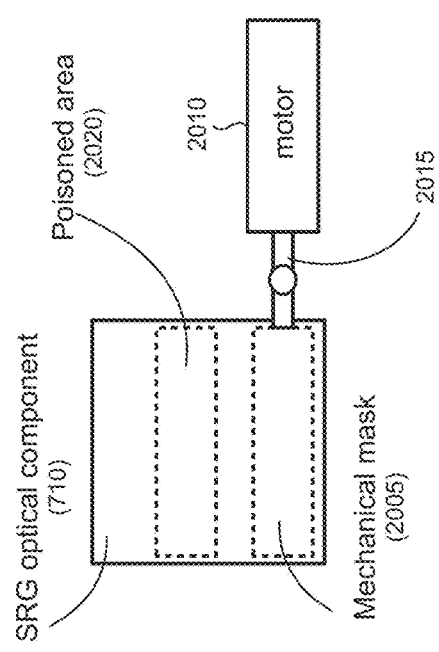
FIG. 20 shows an illustrative mechanical mask that is applied to an SRG optical component.

Thickness-modulated conformal coatings may also be implemented, as a standalone technique or in combination with other techniques (e.g. variably sized coating heads and variable openings) using mechanical masks. For example, as shown in FIG. 20, a mechanical mask 2005 is operably coupled to a motor 2010 via a linkage 2015 to enable select portions of the SRG optical component 710 to be preferentially masked during one or more processing cycles in an ALD reactor. In some implementations, the mask can be variably configurable (e.g., be expanded or contracted, change size/shape, etc.) to enable additional processing flexibility. Alternatively, multiple different variably configurable or statically configured masks may be utilized.

In addition to use of mechanical masks, various areas 2020 of the SRG optical component 710 can be subjected to surface treatments known as poisoning that prevent film growth on the treated areas. Poisoning could be also done using the pixelated gas/plasma source. Other subtractive and preventative processes to control conformal coating thickness may also be utilized in some implementations including, for example, etching.

Figure 21:
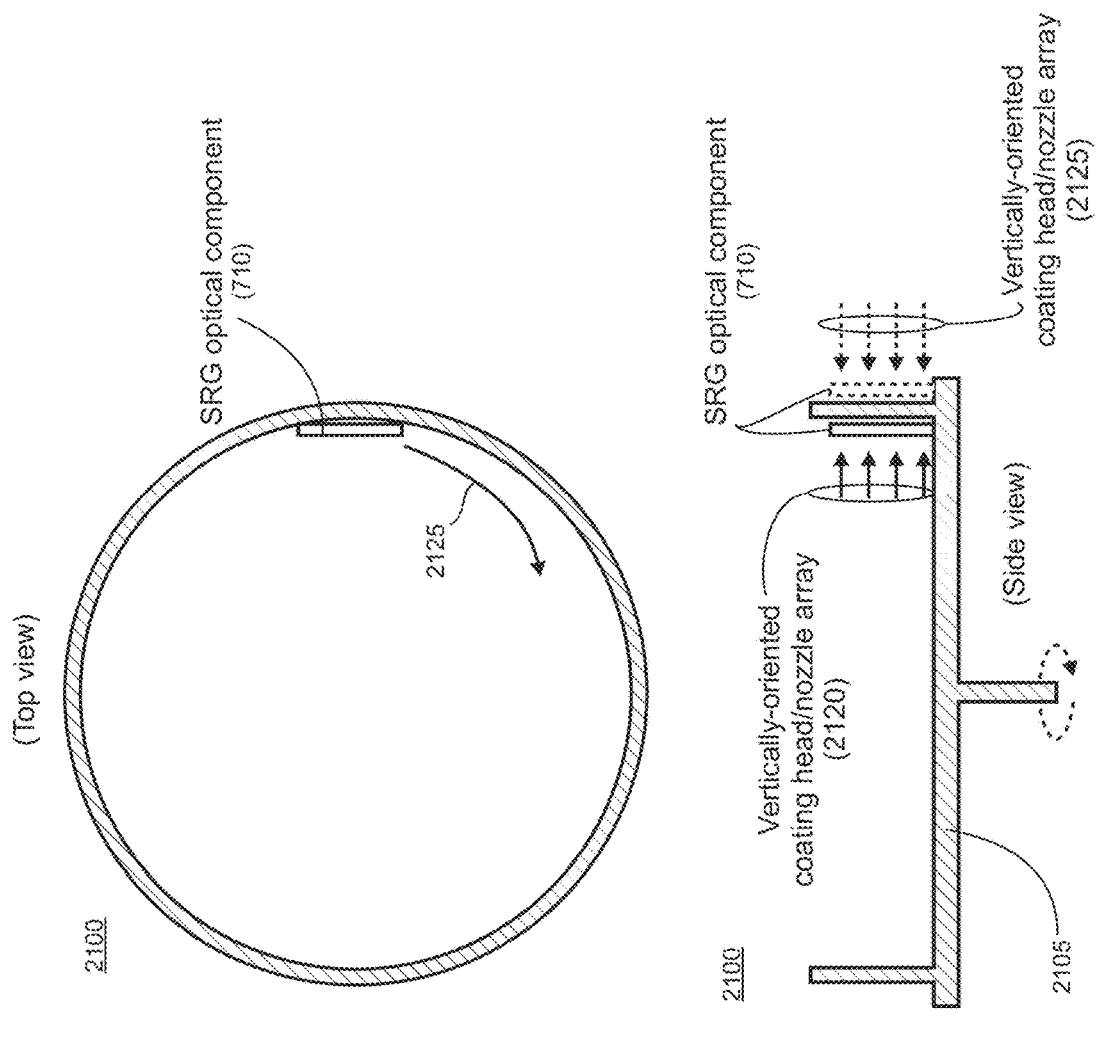
FIG. 21 shows cutaway top and side views of an illustrative rotary thickness-modulated conformal coating reactor in which an SRG optical component is positioned vertically against a wall of the reactor.

FIG. 21 shows cutaway top and side views of an illustrative rotary thickness-modulated conformal coating reactor 2100 in which an SRG optical component 710 is positioned vertically against an interior wall of the reactor. Sets of vertically oriented coating head/nozzle arrays (as representatively indicated by reference numeral number 2120) are positioned in the reactor at various different processing zones to enable preferential spatial exposure of the component to precursors in an ALD process. As the substrate carrier number 2105 rotates about its axis, the SRG optical component traverses a circular path 2125 in the reactor. Utilization of multiple rotational cycles can thereby enable thickness modulated conformal coating growth on the component. In an alternative embodiment, the coating head/nozzle array 2120 may be rotating and the substrates may stay still. In another alternative embodiment, the substrates may be mounted on the outer wall of a rotating cylinder and nozzles 2125 may be placed against the reactor wall.

Figure 22:
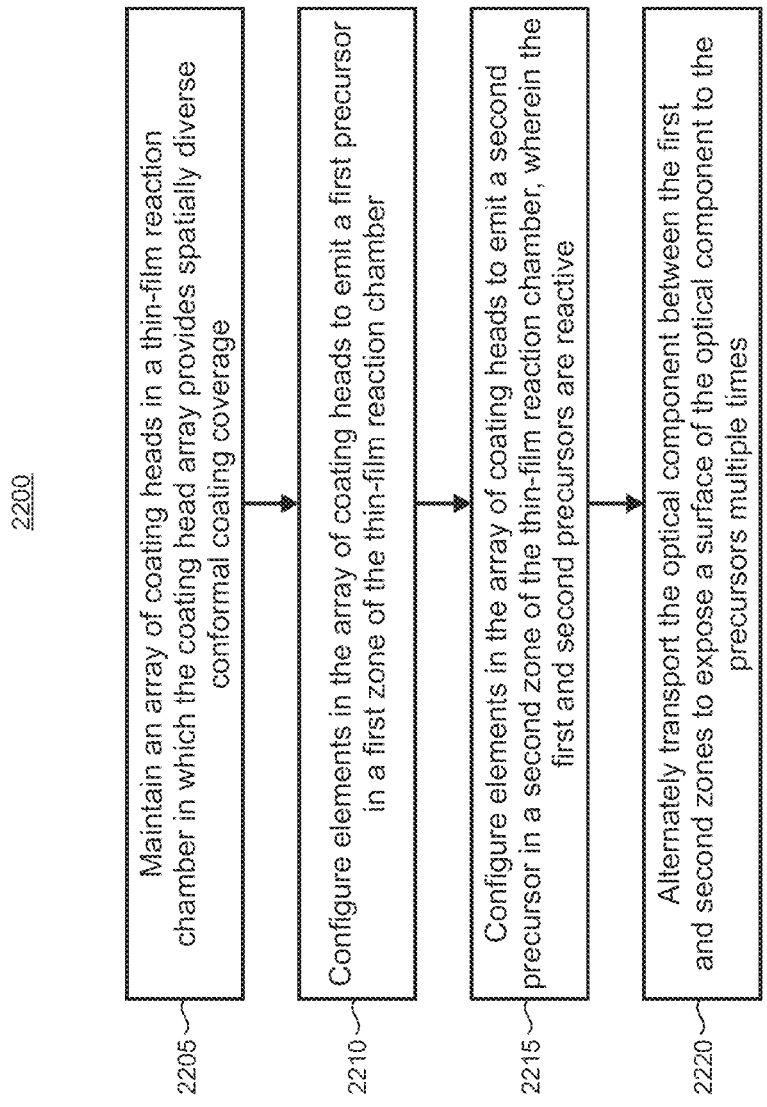
FIG. 22 shows an illustrative method that may be used to implement the present thickness-modulated conformal coatings on optical components.

FIG. 22 is a flowchart of an illustrative method 2200 for growing a thickness-modulated conformal coating an optical component having diffractive optical elements with three-dimensional grating structures that are configured for use in a near-eye display system. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2205, an array of coating heads is maintained in a thin-film reaction chamber in which the coating head array provides spatially diverse conformal coating coverage over the optical component when transported through the thin-film reaction chamber. In step 2210, elements in the array of coating heads are configured to emit a first precursor in a first zone of the thin-film reaction chamber. In step 2215, elements in the array of coating heads are configured to emit a second precursor in a second zone of the thin-film reaction chamber, wherein the first and second precursors are reactive. In step 2220, the optical component is alternately transported between the first and second zones to expose a surface of the optical component to the precursors multiple times, wherein each exposure results in some of the precursors being adsorbed on the surface whereby a thin film is formed on the surface, wherein the elements in the array of coating heads are configured to grow the conformal coating with modulated thickness over the optical component.

Figure 23:
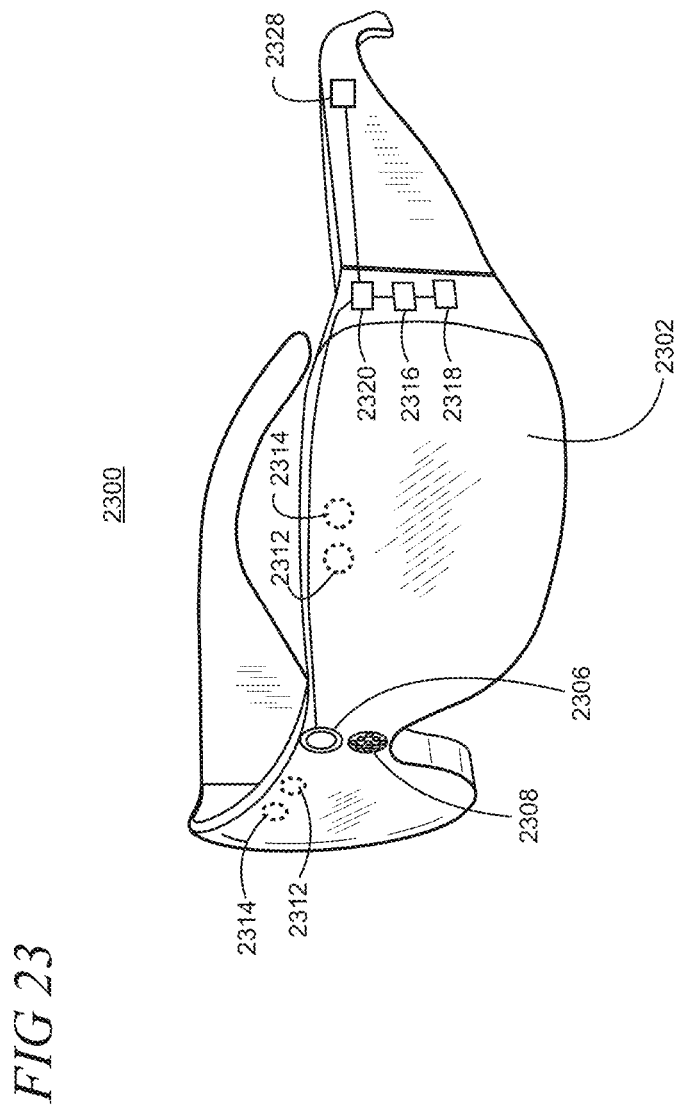
FIG. 23 is a pictorial view of an illustrative example of a virtual reality or mixed reality HMD device.
Figure 24:
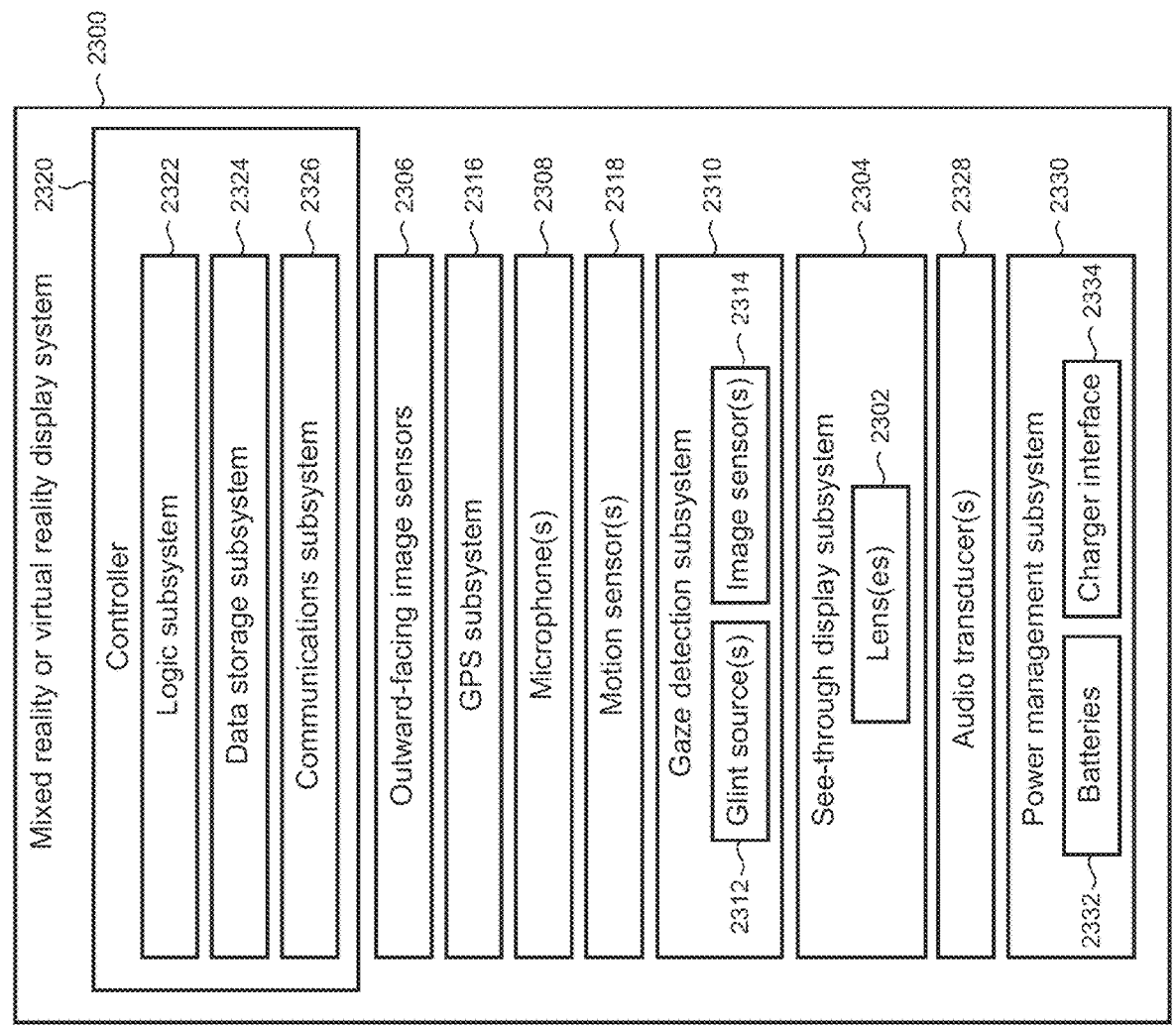
FIG. 24 shows a block diagram of an illustrative example of a virtual reality or mixed reality HMD device.

FIG. 23 shows one particular illustrative example of a see-through, mixed reality or virtual reality display system 2300, and FIG. 24 shows a functional block diagram of the system 2300. Display system 2300 comprises one or more lenses 2302 that form a part of a see-through display subsystem 2304, such that images may be displayed using lenses 2302 (e.g. using projection onto lenses 2302, one or more waveguide systems incorporated into the lenses 2302, and/or in any other suitable manner). Display system 2300 further comprises one or more outward-facing image sensors 2306 configured to acquire images of a background scene and/or physical environment being viewed by a user, and may include one or more microphones 2308 configured to detect sounds, such as voice commands from a user. Outward-facing image sensors 2306 may include one or more depth sensors and/or one or more two-dimensional image sensors. In alternative arrangements, as noted above, an mixed reality or virtual reality display system, instead of incorporating a see-through display subsystem, may display mixed reality or virtual reality images through a viewfinder mode for an outward-facing image sensor.

The display system 2300 may further include a gaze detection subsystem 2310 configured for detecting a direction of gaze of each eye of a user or a direction or location of focus, as described above. Gaze detection subsystem 2310 may be configured to determine gaze directions of each of a user's eyes in any suitable manner. For example, in the illustrative example shown, a gaze detection subsystem 2310 includes one or more glint sources 2312, such as infrared light sources, that are configured to cause a glint of light to reflect from each eyeball of a user, and one or more image sensors 2314, such as inward-facing sensors, that are configured to capture an image of each eyeball of the user. Changes in the glints from the user's eyeballs and/or a location of a user's pupil, as determined from image data gathered using the image sensor(s) 2314, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2310 may have any suitable number and arrangement of light sources and image sensors. In some implementations, the gaze detection subsystem 2310 may be omitted.

The display system 2300 may also include additional sensors. For example, display system 2300 may comprise a global positioning system (GPS) subsystem 2316 to allow a location of the display system 2300 to be determined. This may help to identify real-world objects, such as buildings, etc. that may be located in the user's adjoining physical environment.

The display system 2300 may further include one or more motion sensors 2318 (e.g., inertial, multi-axis gyroscopic, or acceleration sensors) to detect movement and position/orientation/pose of a user's head when the user is wearing the system as part of an mixed reality or virtual reality HMD device. Motion data may be used, potentially along with eye-tracking glint data and outward-facing image data, for gaze detection, as well as for image stabilization to help correct for blur in images from the outward-facing image sensor(s) 2306. The use of motion data may allow changes in gaze location to be tracked even if image data from outward-facing image sensor(s) 2306 cannot be resolved.

In addition, motion sensors 2318, as well as microphone(s) 2308 and gaze detection subsystem 2310, also may be employed as user input devices, such that a user may interact with the display system 2300 via gestures of the eye, neck and/or head, as well as via verbal commands in some cases. It may be understood that sensors illustrated in FIGS. 23 and 24 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2300 can further include a controller 2320 having a logic subsystem 2322 and a data storage subsystem 2324 in communication with the sensors, gaze detection subsystem 2310, display subsystem 2304, and/or other components through a communications subsystem 2326. The communications subsystem 2326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2324 may include instructions stored thereon that are executable by logic subsystem 2322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 2300 is configured with one or more audio transducers 2328 (e.g., speakers, earphones, etc.) so that audio can be utilized as part of an mixed reality or virtual reality experience. A power management subsystem 2330 may include one or more batteries 2332 and/or protection circuit modules (PCMs) and an associated charger interface 2334 and/or remote power interface for supplying power to components in the display system 2300.

It may be appreciated that the display system 2300 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 25:
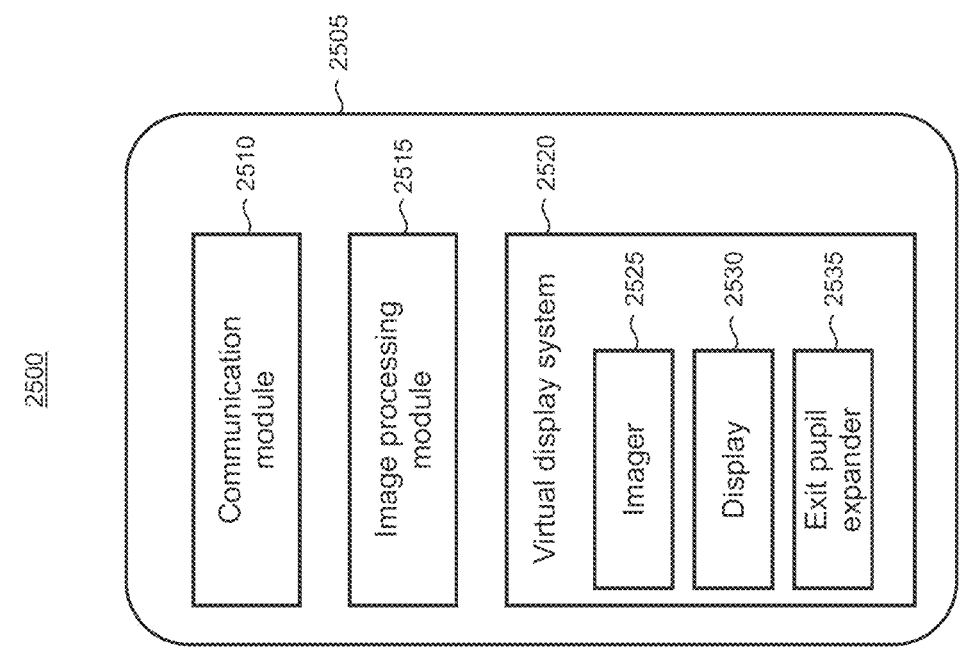
FIG. 25 shows a block diagram of an illustrative electronic device that incorporates a mixed reality display system.

As shown in FIG. 25, a mixed reality display system using optical components with thickness-modulated conformal coatings can be used in a mobile or portable electronic device 2500, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2500 includes a housing 2505 to house a communication module 2510 for receiving and transmitting information from and to an external device, or a remote system or service (not shown).

The portable device 2500 may also include an image processing module 2515 for handling the received and transmitted information, and a virtual display system 2520 to support viewing of images. The virtual display system can include a micro-display or an imager 2525 and an optical display system 2530 that may use thickness-modulated conformal coatings on various optical components therein. The image processing module 2515 may be operatively connected to the optical display system to provide image data, such as video data, to the imager to display an image thereon. An EPE 2535 can be optically linked to an optical display system.

A mixed reality display system using optical components with thickness-modulated conformal coatings may also be utilized in non-portable devices, such as gaming devices, multimedia consoles, personal computers, vending machines, smart appliances, Internet-connected devices, and home appliances, such as an oven, microwave oven and other appliances, and other non-portable devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for growing a thickness-modulated conformal coating on an optical component having diffractive optical elements (DOEs) with three-dimensional grating structures that are configured to transmit a field of view (FOV) in a near-eye display system, the method comprising:
    maintaining an array of coating heads in a thin-film reaction chamber in which the coating head array provides spatially diverse conformal coating coverage over the optical component when transported through the thin-film reaction chamber;
    configuring elements in the array of coating heads to emit a first precursor in a first zone of the thin-film reaction chamber;
    configuring elements in the array of coating heads to emit a second precursor in a second zone of the thin-film reaction chamber, wherein the first and second precursors are reactive;
    alternately transporting the optical component between the first and second zones to expose a surface of the optical component to the precursors multiple times, wherein each exposure results in some of the precursors being adsorbed on the surface whereby a thin film is formed on the surface; and
    tuning optical parameters of the DOEs in the optical component over different angles of the FOV by controlling growth of the conformal coating with modulated thickness over the optical component.

2. The method of claim 1 in which one or more members of the coating head array are configured to emit at least two different precursors.

3. The method of claim 1 in which one or more members in the coating head array are configured to emit an inert gas.

4. The method of claim 1 in which the thin-film reaction chamber uses one or more of thermal ALD (atomic layer deposition), spatial ALD, PEALD (plasma enhanced ALD), CVD (chemical vapor deposition), or pulsed plasma CVD.

5. The method of claim 1 in which the thin-film reaction chamber has a configuration including one of linear reactor or rotary reactor.

6. The method of claim 1 in which the array of coating heads comprises one of linear array, two-dimensional spatial array, or pixelated array.

7. The method of claim 1 further comprising controlling exposure of selected areas of the surface of the optical component to the first or second precursor.

8. The method of claim 7 in which the controlled exposure comprises one of a masking, preventative, or subtractive process.

9. The method of claim 8 in which the preventative process comprises poisoning and the subtractive process comprises etching.

10. The method of claim 1 in which the optical component comprises an in-coupling DOE and an out-coupling DOE and wherein the thickness-modulated conformal coating coats the optical component from at least a portion of the in-coupling DOE to at least a portion of the out-coupling DOE, wherein the coating is thicker on the in-coupling DOE relative to the coating on the out-coupling DOE.

11. The method of claim 1 in which the thickness-modulated conformal coating comprises one or more of zinc sulfide, zinc oxide, tantalum oxide, hafnium oxide, zirconium oxide, titanium oxide, aluminum oxide, magnesium fluoride, silicon nitride or silicon oxide.

12. A method for manufacturing polymeric optical components each having diffractive optical elements (DOEs) with three-dimensional grating structures that are configured to transmit a field of view (FOV) in a near-eye display system, the DOEs including an in-coupling DOE and an out-coupling DOE, the method comprising:
    providing a master grating from which the polymeric optical components are replicated;
    maintaining an array of coating heads in a thin-film reaction chamber in which the coating head array provides spatially diverse conformal coating coverage over the master grating when transported through the thin-film reaction chamber;
    configuring elements in the array of coating heads to emit a first precursor in a first zone of the thin-film reaction chamber;
    configuring elements in the array of coating heads to emit a second precursor in a second zone of the thin-film reaction chamber, wherein the first and second precursors are reactive;
    alternately transporting the master grating between the first and second zones to expose a surface of the optical component to the precursors multiple times, wherein each exposure results in some of the precursors being adsorbed on the surface whereby a thin film is formed on the surface as a conformal coating; and
    selectively exposing the master grating to the first or second precursors to control a thickness of the conformal coating to adjust dimensions of the replicated polymeric optical components.

13. The method of claim 12 in which the master grating comprises a quartz crystalline structure.

14. The method of claim 12 further comprising subjecting the master grating to a subtractive process.

15. The method of claim 12 in which the adjusting of dimensions of the replicated polymeric optical components enables grating parameters for the DOEs to be tuned over different angles of the FOV.

16. The method of claim 12 further comprising replicating the polymeric optical components from the master grating.

17. A method for manufacturing a polymeric optical component, the method comprising:
    providing the polymeric optical component with diffractive optical elements (DOEs) having three-dimensional grating structures that are configured to transmit a field of view (FOV) in a near-eye display system, the DOEs including an in-coupling DOE and an out-coupling DOE disposed on the optical component;

maintaining an array of coating heads in a thin-film reaction chamber in which the coating head array provides spatially diverse conformal coating coverage over the optical component when transported through the thin-film reaction chamber;

configuring elements in the array of coating heads to emit a first precursor in a first zone of the thin-film reaction chamber;

configuring elements in the array of coating heads to emit a second precursor in a second zone of the thin-film reaction chamber, wherein the first and second precursors are reactive;

alternately transporting the optical component between the first and second zones to expose the DOEs of the optical component to the precursors multiple times, wherein each exposure results in some of the precursors being adsorbed on the DOEs to form a thin film as a conformal coating; and controlling the exposure to modulate a thickness of the conformal coating, wherein the conformal coating thickness decreases with increasing distance from the in-coupling DOE.

18. The method of claim 17 in which the modulation of thickness is smooth without sharp thickness transitions.

19. The method of claim 17 further including forming multiple thickness-modulated conformal coatings on the DOEs as a stack, in which a refractive index of adjacent thickness-modulated conformal coatings in the stack is different.

20. The method of claim 17 further including providing a thickness-modulated conformal coating on the in-coupling DOE that is higher relative to the thickness-modulated conformal coating on the out-coupling DOE.

* * * * *